United States Patent
Van de Velde et al.

(10) Patent No.: US 6,788,826 B1
(45) Date of Patent: Sep. 7, 2004

(54) METHOD FOR CORRECTING ARTEFACTS IN A DIGITAL IMAGE

(75) Inventors: Koen Van de Velde, Duffel (BE); Pieter Vuylsteke, Mortsel (BE)

(73) Assignee: Agfa-Gevaert, Mortsel (BE)

( * ) Notice: Subject to any disclaimer, the term of this patent is extended or adjusted under 35 U.S.C. 154(b) by 0 days.

(21) Appl. No.: 09/437,872

(22) Filed: Nov. 10, 1999

Related U.S. Application Data (60) Provisional application No. 60/124,288, filed on Mar. 12, 1999.

(30) Foreign Application Priority Data

Nov. 10, 1998 (EP) ............................................. 98203786

(51) Int. Cl.$^7$ .................................................. G06K 9/40
(52) U.S. Cl. ....................................... 382/275; 382/260
(58) Field of Search .............................. 382/100, 128, 382/130, 131, 132, 199, 275, 260–264, 265, 266, 254; 37/62

(56) References Cited

U.S. PATENT DOCUMENTS

| | | | | |
|---|---|---|---|---|
| 5,717,791 A | * | 2/1998 | Labaere et al. ............... | 382/274 |
| 5,799,100 A | * | 8/1998 | Clarke et al. ................. | 382/132 |
| 5,870,502 A | * | 2/1999 | Bonneau et al. ............. | 382/249 |
| 5,926,568 A | * | 7/1999 | Chaney et al. ............... | 382/217 |
| 5,982,917 A | * | 11/1999 | Clarke et al. ................. | 382/132 |
| 6,064,768 A | * | 5/2000 | Hajj et al. .................... | 382/195 |
| 6,078,680 A | * | 6/2000 | Yoshida et al. .............. | 382/128 |

FOREIGN PATENT DOCUMENTS

EP   0712092   5/1996

OTHER PUBLICATIONS

"Contrast Enhancement Via Multiscale Gradient Transformation" by Lu et al. IEEE pp. 482–486; Nov. 13, 1994.
"Adaptive Feature Enhancement for Mammographic Images with Wavelet Multiresolution Analysis" by Chen et al. Journal of Electronic Imaging/Oct. 1997/vol. 6(4) pp. 467–478.
"Wavelets for Contrast Enhancement of Digital Mammography" by Laine et al.; IEEE Engineering in Medicine and Biology; Sep./Oct. 1995; pp. 536–550.

* cited by examiner

*Primary Examiner*—Jayanti K. Patel
(74) *Attorney, Agent, or Firm*—John A. Merecki; Hoffman, Warnick & D'Alessandro (57) ABSTRACT

A method of correcting artefacts in a processed digital image represented by a multi-scale gradient representation being obtained by non-linear processing of a multi-scale gradient representation of an original image. A modified gradient representation is generated by modifying gradient images of the multi-scale gradient representation of the processed image so that the directions of the gradient images are pixel-wise equal to those of the gradient images of the multi-scale gradient representation of the original image. A reconstruction algorithm is then applied to the modified gradient representation.

9 Claims, 6 Drawing Sheets

METHOD FOR CORRECTING ARTEFACTS IN A DIGITAL IMAGE

This application claims the benefit of U.S. Provisional Appln. No. 60/124,288 filed Mar. 12, 1999.

FIELD OF THE INVENTION

This invention relates to digital image processing. More particularly, it relates a method for correcting artefacts originating from non-linear treatment of components (coefficients) of a multi-scale image representation.

The method is applicable e.g. in a medical radiographic system, such as a computed radiography (CR) system or a computed tomography (CT) system.

BACKGROUND OF THE INVENTION

In imaging systems where the final output image has to be evaluated by a human observer, a problem arises if the original image, as obtained from an image sensing device, contains detail information at various degrees of coarseness, within a wide amplitude range. This situation is typical when the sensor has a good signal to noise ratio over a large dynamic range, which is the case with CR and CT. In common working environments such as a hospital there is no time for selecting the optimal window/level setting (if any) for each individual image, so there is a need to display a single image on film or monitor screen, which reveals all the relevant diagnostic details with an acceptable contrast over the whole dynamic range. This problem has been recognized in the field of digital radiography, see:

Mack I., Heitzel U., Optimized image processing for routine digital radiography. Proceedings International Symposium CAR, 191, p. 109, Springer Verlag.

Many methods for contrast enhancement have been developed, such as the commonly known techniques of unsharp masking (Cocklin, M. L., Gourlay A. R., Jackson P. H., Kaye G., Kerr I. H., and Lams P., Digital processing of chest radiographs, Image and Vision Computing, Vol. 1, No. 21, 67–68 (1983)) and adaptive histogram modification (Pizer S. M., Amburn E. P., Austin J. D., Cromartie R., Geselowitz A., Greer T., Ter Haar Romery B., Zimmerman J. B., and Zuiderveld K., Adaptive histogram equalisation and its variations, Computer Vision, Graphics, and Image Processing, Vol. 39, 355–368 (1987)). These traditional methods suffer from two problems:

1. They fix to a particular filter size, whereas diagnostic details may occur at multiple scales in one and the same image. It may be desired to enhance details in the image at every possible scale.
2. Artefacts are created in the vicinity of significant signal level transitions, e.g. a bone/soft tissue boundaries within the image. These artificats may impair the diagnosis.

To overcome the first problem, multiscale methods for contrast enhancement have been developed in the past few years, see Vuylsteke P., Schoeters E., Multiscale Image Contrast Amplification (MUSICA), Proceedings of SPIE, Vol. 2167, 5510560 (1994) and Lu J., Healy D. M. Jr., Contrast enhancement via multiscale gradient transformation, In Proceedings of SPIE: Wavelet applications, Orlando, Fla. (1994); Fan J., Laine A., Contrast enhancement by multiscale and nonlinear operators, in Wavelets in medicine and biology, Akram Aldroubi and Michael Unser eds., CRC Press (1996).

While effectively curing this first problem, these methods also seem to perform well with regard to the second problem. The MUSICA algorithm is being used routinely in several hospitals around the world and there are no complaints about artefacts in CR. We have however noted that one has to be more careful in using these methods on CT images, since they have sharper signal level transitions and artefacts might still be created there.

OBJECTS AND OF THE INVENTION

It is an object of the present invention to provide a method which corrects for artefacts i.a. originating from nonlinear treatment of components (coefficients) in a multi-scale representation.

Further objects of the present invention will become apparent from the description hereafter.

DESCRIPTION OF THE INVENTION

Statement of the Invention

The objects of the present invention are achieved by a method as set forth in claim 1.

The method of this invention is based on a multiscale gradient representation such as described in: Mallat S., Zhong S., Characterization of signals from multiscale edges, IEEE Trans. on Pattern analysis and Machine Intelligence, Vol. 14, No. 7 (1992)).

The method has two basic steps. The first step is the nonlinear processing step, e.g. a contrast enhancement step (e.g. using an algorithm similar to that of Lu and Healy (see above)). The second and novel part is an artefact correcting step. This step can be used to correct artefacts caused by any nonlinear treatment of the coefficients in the multiscale gradient representation and its use is therefore not necessarily restricted to the problem of contrast enhancement.

BRIEF DESCRIPTION OF THE DRAWINGS

Further advantages and embodiments of the present invention will become apparent from the following detailed description illustrated by means of the following drawings wherein.

DETAILED DESCRIPTION OF THE PRESENT INVENTION

Multiscale gradient representation

A digital image f is a map from a square grid of pixels P to the real numbers R. The multiscale gradient representation is a decomposition of the image into a series (say R, R=1,2,3, ... ) of vector-valued images on P (i.e. maps from P to $R^1$) $\overline{W}_0 f, \ldots, \overline{W}_{K-1} f$ and a residual image $S_K f$, each having the size of the original image (no subsampling takes place). Let $S_0 f = f$ and for $j=1, \ldots, K$, $S_j f$ is obtained from $S_{j-1} f$ by applying a smoothing filter, then $\overline{W}_j f$ is defined to be the (discrete) gradient of $S_j f$. We will refer to $\overline{W}_0 f, \ldots, \overline{W}_{K-1} f, S_K f$ as the multiscale gradient representation (MGR) of digital image f.

The smoothing and gradient filtering are obtained by two-dimensional convolution.

An efficient implementation of such filters is based on successively applying a horizontal 1-D convolution filter, followed by a vertical 1-D convolution filter, applied to the result of the first filter. If the horizontal filter is denoted by a and the vertical filter by b, then the resulting 2-D filter is commonly denoted by $a \otimes b$.

The filters at multiple scales are generated from a basic filter at the smallest scale. The corresponding filters at subsequent larger scales j=1, ... K, are obtained by inserting $2^j-1$ zero-valued coefficients between any two coefficients of the basic filter.

In a preferred embodiment, a basic smoothing filter $h_0$ is used with coefficients (1/16, 4/16, 6/16, 4/16, 1/16). The underlined filter tap is defined to be the filter origin (i.e. center tap, which has index zero). The basic gradient filter is chosen as $g_0$=(1/2,−1/2).

The corresponding filters at subsequent larger scales are obtained by inserting zero coefficients as described above:

$h_1$=(1/16,0,4/16,0,6/16, 0,4/16,0,1/16), $g_1$=(1/2,0,−1/2), $h_2$=(1/16,0,0,0,4/16,0,0,0,6/16,0,0,0,4/16,0,0,0,1/16), $g_1$=(1/2,0,0,0,−1/2).

If a filter has an even number of tags (e.g. $g_1$), then the filter at the next larger scale has an odd number of taps, and the filter origin is shifted one position to the right. Appropriate combinations of these filters in horizontal and vertical directions are selected to generate the 2-D filters needed for the MGR decomposition:

$$S_0 f = f$$

$$S_j f = (h_{j-1} \otimes h_{j-1})(S_{j-1} f), \text{ for } 0 < j \leq K$$

$$\overline{W}_j f = ((g_j \otimes \delta_0)^* S_j f, (\delta_0 \otimes g_j)^* S_j f) \quad (1)$$

Here, * is the convolution operator and $\delta_0$ the Kronecker delta (i.e. the 1-D filter in which the center tap has a coefficient equal to 1 and all other taps have a coefficient equal to 0).

Hence, $g_j \otimes \delta_0$ means filtering by $g_j$ in the horizontal direction only and the $\delta_0 \otimes g_j$ is equivalent to applying the filter $g_j$ in the vertical direction only.

Clearly $S_j f$ is a smoothed version of $S_{j-1} f$, where $\overline{W}_j f$ is the (discrete) gradient of $S_j f$ at scale j.

When colvolving an image f with a filter, the image is extended at the borders in a continuous way by reflection about the image borders. After performing the convolution with this extended image, the result is again restricted to the pixelset of the original image.

Figure 1:
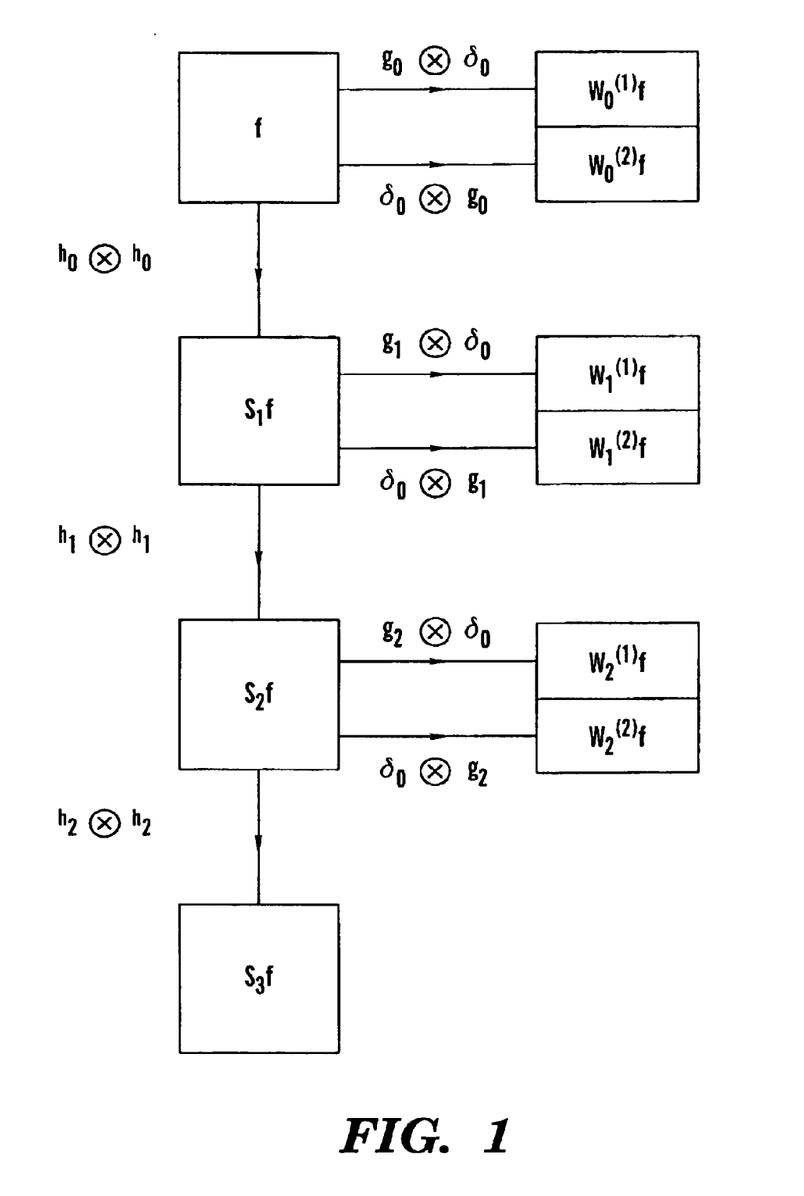
FIG. 1 shows a multiscale gradient decomposition.

The decomposition is schematized in FIG. 1 (in this Figure, superscripts (1) and (2) refer to the horizontal and vertical component of the gradients respectively).

It is well known that this decomposition is reversible, i.e. the original image can be entirely recovered from the representation by a reconstruction procedure, denoted by the inverse multiscale gradient (IMG). To this end, two additional filters $p_0$ and $q_0$ are needed with the constraint that $$p_0 * h_0 + q_0 * g_0 = \delta_0 \quad (2)$$

$p_0$ and $q_0$ are basic 1-D filters.

Filters $p_j$ and $q_j$ at larger scales j are generated by inserting $2^j-1$ zero coefficients between successive taps, as described above.

The IMG reconstruction is carried out as explained in Zong, S, "Edge representation from wavelet transform maxima", Ph.D. Thesis, New York University, 1990 as follows:

$$S_j f = (p_j \otimes p_j)^* S_{j+1} f + (q_j \otimes l_j)^* W_j^{(1)} f + (l_j \otimes q_j)^* W_j^{(2)} f, \ j \geq 0. \quad (3)$$

The 1-D filter $l_j$ is defined as $l_j = 1/2(\delta_0 + p_j * h_j)$.

(superscripts (1) and (2) denote horizontal and vertical direction).

Figure 2:
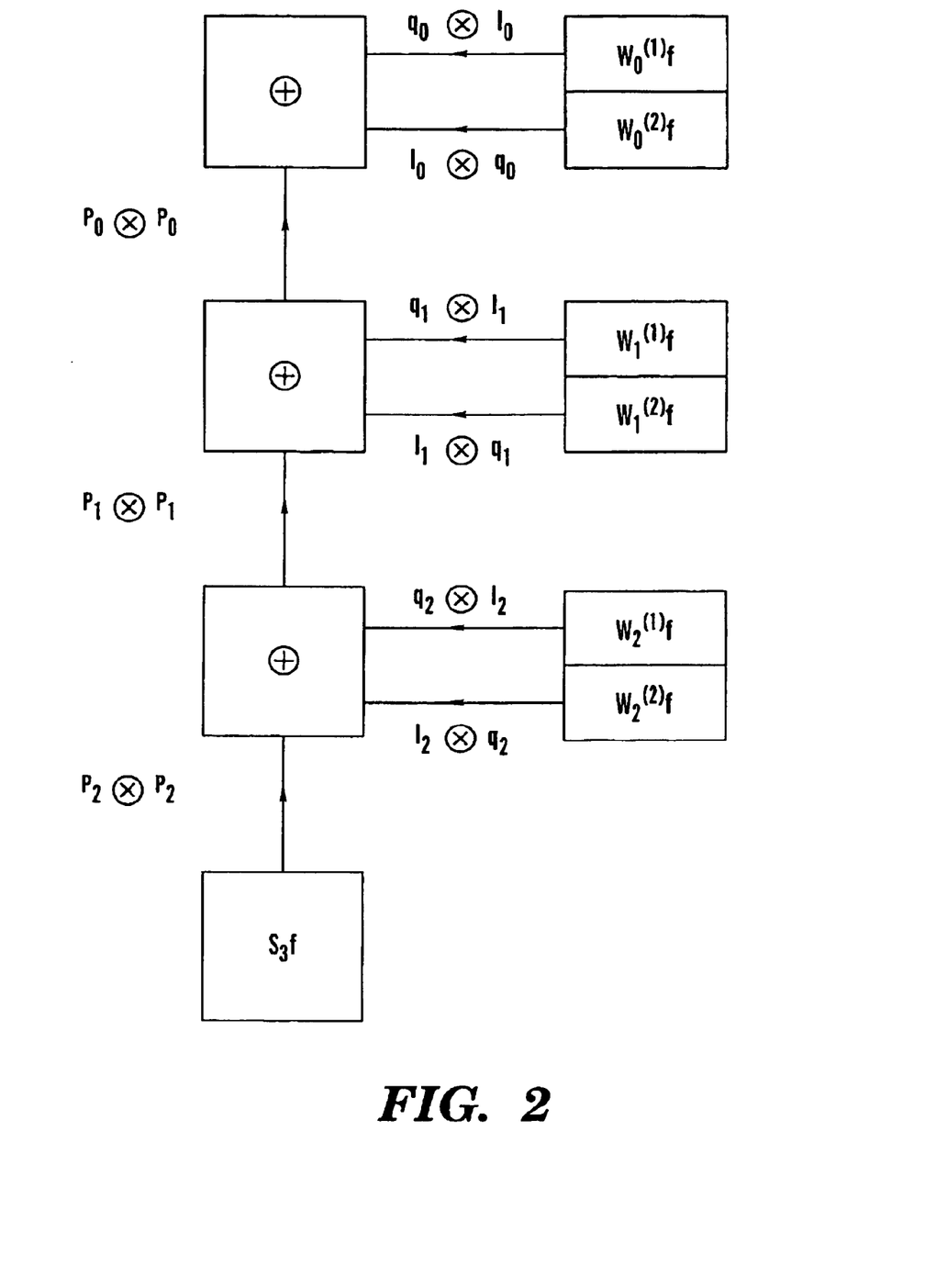
FIG. 2 shows a multiscale gradient reconstruction.
Figure 3:
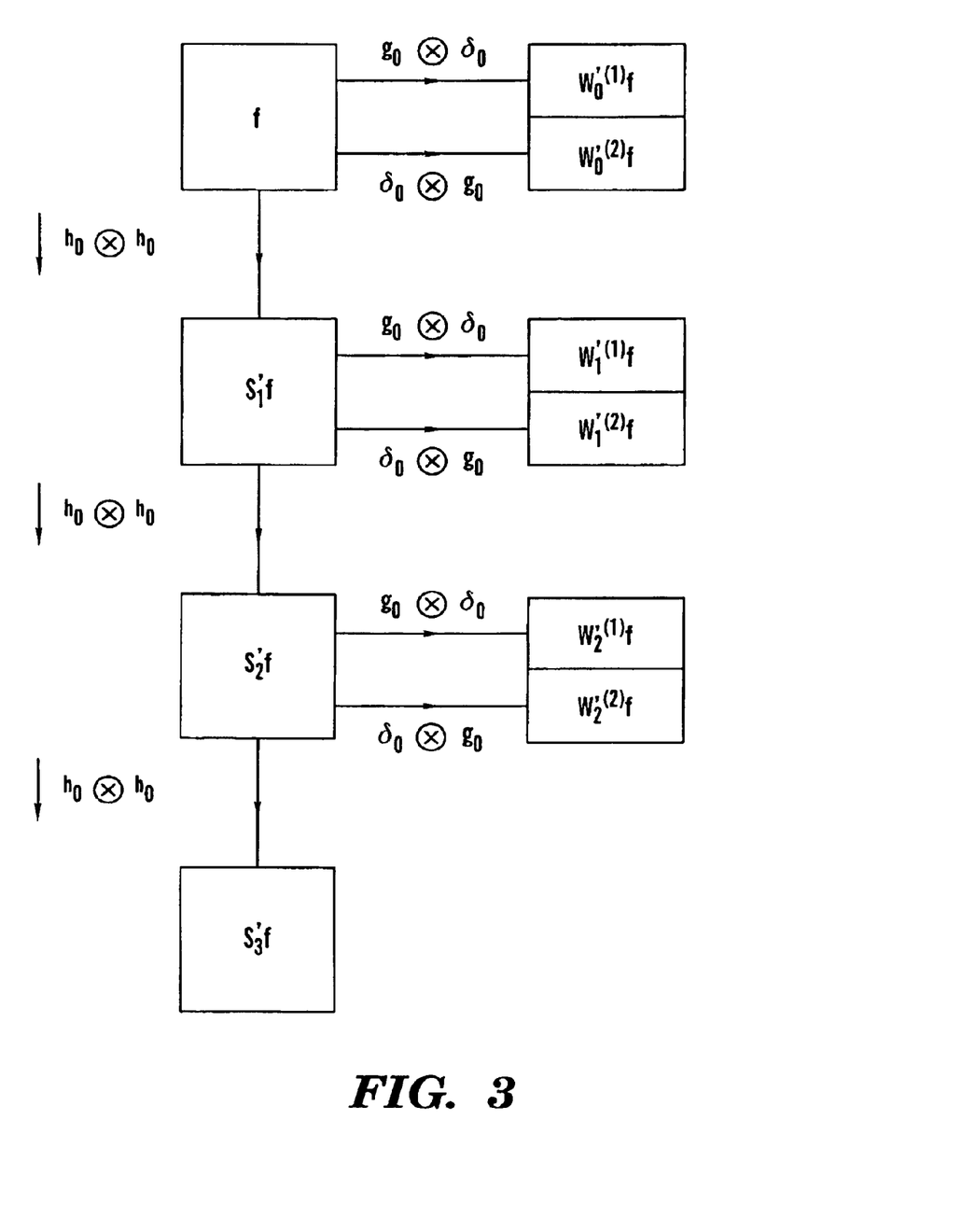
FIG. 3 shows a multiscale gradient pyramidal decomposition.

The image is recovered from the low-resolution image $S_K f$ and the gradients $\overline{W}_0 f, \ldots \overline{W}_{K-1} f$ by repeated use of this equation for j=K−1, ..., 0. (see FIG. 2).

The filters $p_0$ and $q_0$ should be sufficiently smooth to avoid discontinuities when reconstructing the images from a set of nonlinearly modified transform coefficients (as will always be the case when doing contrast enhancement).

In a preferred embodiment $p_0$=(1/4,0,1/2,0,1/4) and $q_0$= (−1/32,−5/32,−13/32,−25/32,25/32,13/32,5/32,1/32). These filters comply with constraint (2).

In a first embodiment, the number of pixels remains constant at each scale. Such a representation is commonly called a multiscale stack.

In a second embodiment, the numbers of pixels is lowered in each step of the decomposition, by subsampling. Such a representation is commonly denoted by a multiscale pyramid.

The MGR decomposition is then defined as:

$$S_0 f = f$$

$$S_j f = \downarrow (h_0 \otimes h_0)^* S_{j-1} f, \text{ for } 1 \leq j \leq K \quad (4)$$

$$\overline{W}_j f = ((g_0 \otimes \delta_0)^* S_j f, (\delta_0 \otimes g_0)^* S_j f) \text{ for } 0 \leq 1 \leq j \leq k-1$$

Here $\downarrow$ denotes downsampling by a factor of two, keeping only the pixels with even coordinates (2x,2y), where (x,y) refers to the pixel coordinates in the current grid.

The pixels of the resulting image are renamed from (2x,2y) to (x,y). The number of pixels is halved in both dimensions, in each stage of the pyramidal decomposition. The reconstruction from the MGR pyramid is done using the equation $$\downarrow S_j f = (p_0 \otimes p_0)^* S_{j+1} + \downarrow (q_0 p \otimes l_0)^* W_j^{(1)} f + \downarrow (l_0 \otimes p_0)^* W_j^{(2)} f, \ j \geq 0 (5)$$

where $p_0$(1/4,1/2,1/4).

The reconstruction procedure (5) is equivalent to a subsampling the result of the reconstruction (3), taking into account that $(p_0 \otimes p_0) \downarrow f = (p_0 \otimes p_0) f$, for any arbitrary image f, if $p_0$ has zero coefficients between subsequent taps. The latter condition is fulfilled if $p_0$=(1/4,0,1,2,0,1/4)

Equation (5) tells us how to obtain a subsampled version $\downarrow S_j f$ of $S_j f$. The full-size reconstructed image $S_j f$ is next calculated from $\downarrow S_j f$ and $\overline{W}_j f$ ($\overline{W}_j f$ being the gradient of $S_j f$) in the following way. First the pixels with coordinates (x,y) of the subsampled reconstruction $\downarrow S_j f$ (further called sample pixels) are assigned new coordinates values (2x,2y).

The pixels of the full-size reconstructed image at positions (2x+1,2y) lying in between the two sample pixels (2x,2y) and (2x+2,2y) are computed by:

$$S_j f(2x+1,2y) = 1/2[S_j f(2x,2y) - 2W^{(1)} f(2x,2y) + S_j f(2x+2,2y) + 2W_j^{(1)} f(2x+1,2y)] \quad (6)$$

The pixels with coordinates (2x,2y+1) lying in between the two sample pixels (2x,2y) and (2x,2y+2) are computed by:

$$S_j f(2x,2y+1) = 1/2[S_j f(2x,2y) - 2W_j^{(1)} fg(2x,2y) + S_j f(2x,2y+2) + 2W_h^{(2)} f(2x,2y+1)] \quad (7)$$

The pixels with coordinates (2x+1,2y+1) in between the four sample pixels (2x,2y),(2x+2,2y),(2x,2y+2) and (2x+2, 2y+2) are computed by:

$$S'_j f(2x+1, 2y+1) = \qquad (8)$$

$$1/4 \begin{bmatrix} S'_j f(2x+1, 2y) - 2W'^{(2)}_j f(2x+1, 2y) + \\ S'_j f(2x, 2y+1) - 2W'^{(1)}_j f(2x, 2y+1) + \\ S'_j f(2x+1, 2y+2) + 2W'^{(2)}_j f(2x+1, 2y+1) + \\ S'_j f(2x+2, 2y+1) + 2W'^{(1)}_j f(2x+1, 2y+1) \end{bmatrix}$$

We will refer to the latter procedure (described by equations 6–8) as gradient based interpolation (GBI).

Figure 4:
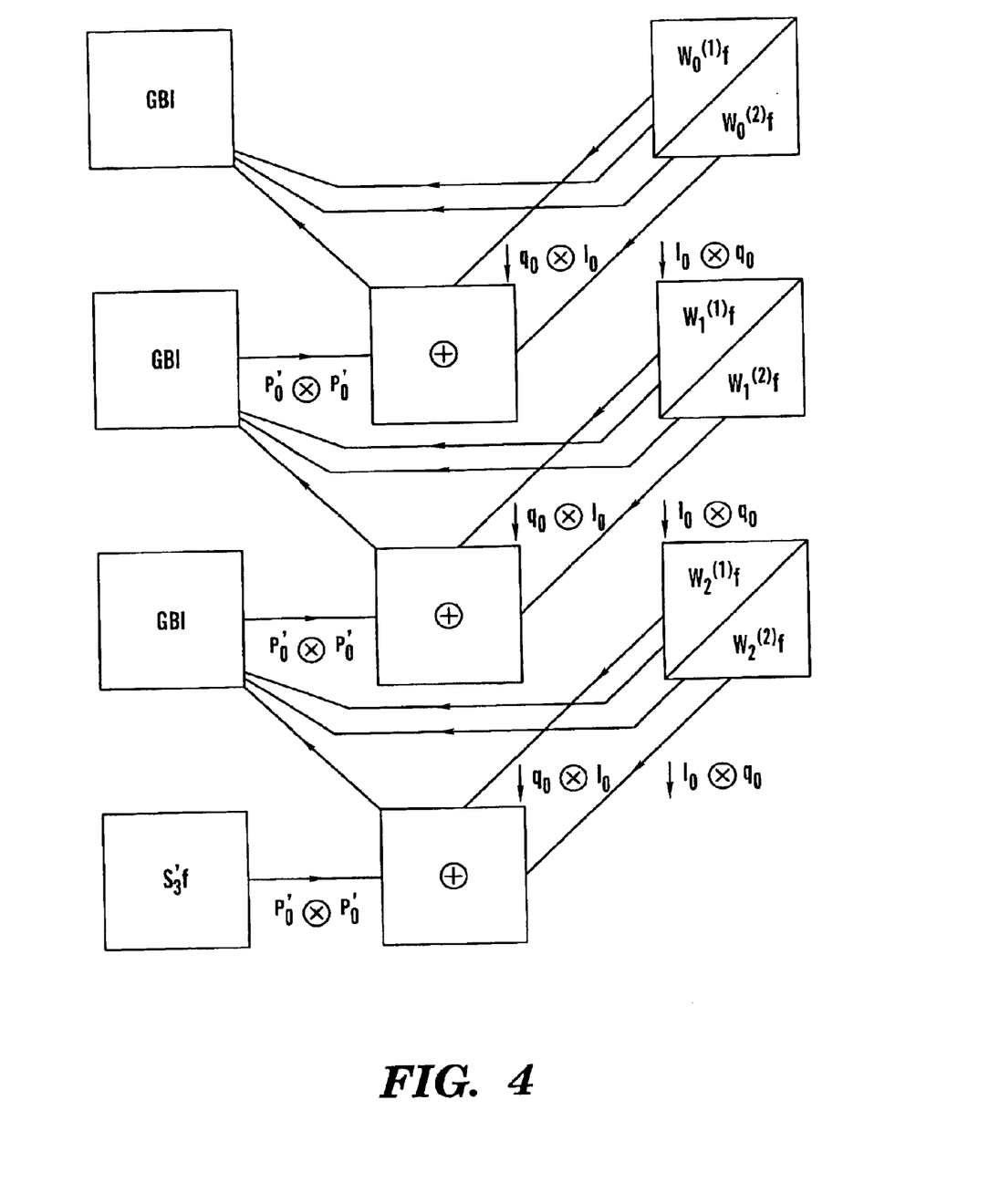
FIG. 4 shows a multiscale gradient pyramidal reconstruction.

The pyramidal reconstruction scheme is depicted in FIG. 4.

Contrast enhancement step

First the multiscale gradient representation $\overline{W}_0 f, \ldots, \overline{W}_{K-1} f, S_K f$ (or $\overline{W}'_0 f, \ldots, \overline{W}'_{K-1} f, S'_K f$ in case of the pyramid) of the image f is calculated.

To enhance the contrast in the image it is desired to modify the transform coefficients in such a way that details of small amplitude are enlarged at the expense of the ones with larger amplitude, and this uniformly at all scales. Therefore the transform coefficients are preferably modified in a nonlinear, monotonic way.

In a preferred embodiment, the following contrast enhancement function is used:

$$y(x) = \left(\frac{m}{c}\right)^p \text{ if } 0 \leq x < c \qquad (9)$$

$$y(x) = \left(\frac{m}{x}\right)^p \text{ if } c \leq x \leq m$$

m is an upper bound for the transform coefficients, 0<p<1 determines the degree of nonlinearity and c prevents the function y from getting too large or small values of x. This is done to prevent unnecessary over-enhancement of the noise in the image. The value of c should therefore preferably be related to the noise content of the image, e.g. we can take c to be the estimated standard deviation of the noise in the image.

Figure 5:
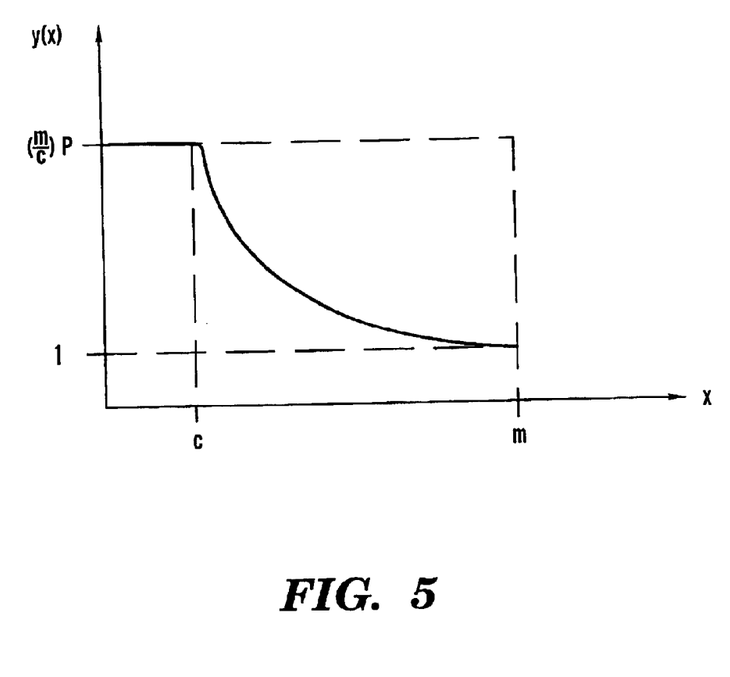
FIG. 5 is a contrast enhancement function.
Figure 6:
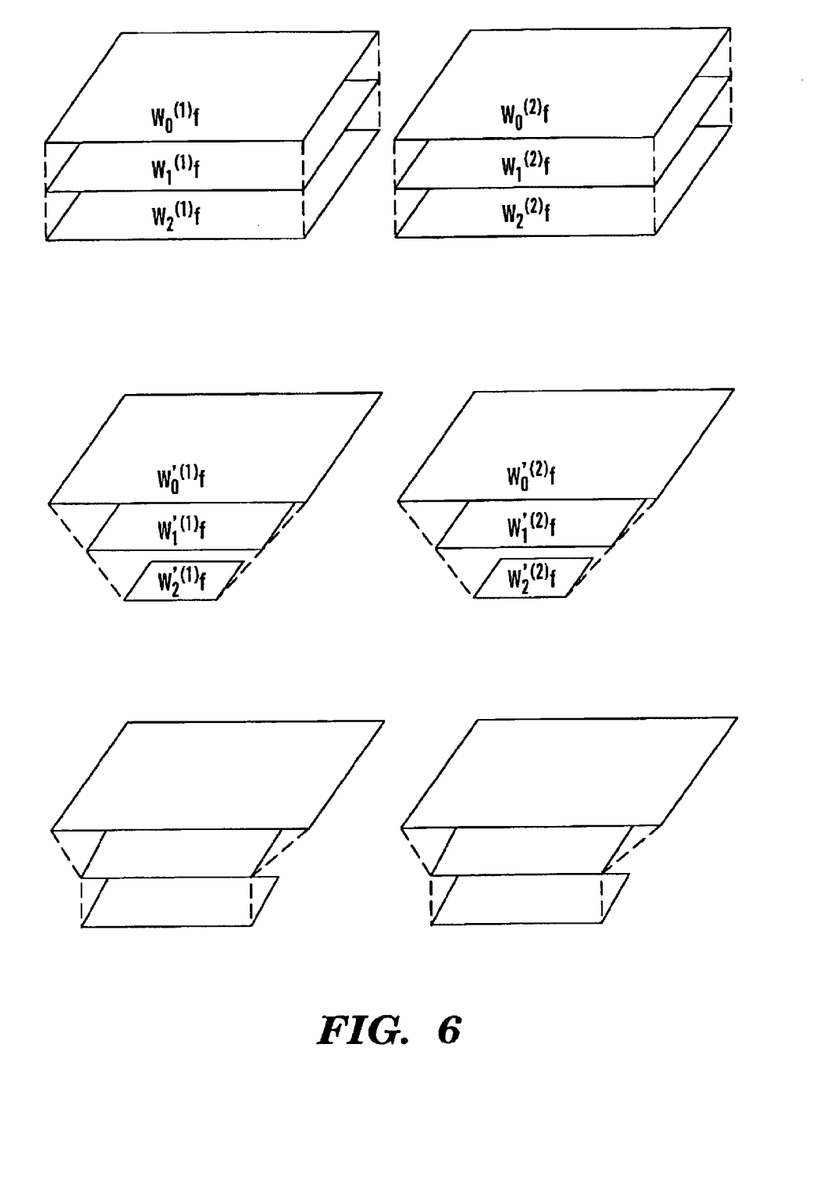
FIG. 6a shows a multiscale gradient stack representation.
FIG. 6b is a multiscale gradient pyramid representation.
FIG. 6c is a combination of stack and pyramid representations.

The function y is continuous and monotonically decreasing, has a constant value $$\left(\frac{m}{c}\right)^p > 1$$

for 0<x<c and reaches the value 1 for x=m. (see FIG. 5).

The modified multiscale representation $\overline{V}_0, \ldots, \overline{V}_{K-1}, S_K f$ (alternatively $\overline{V}'_0, \ldots, \overline{V}'_{K-1}, S'_K f$ in case of a pyramidal decomposition) is defined as $$\overline{V}_j(i) = \overline{W}_j f(i) \cdot y([(W_j^{(1)} f(i))^2 + (W_j^{(2)} f(i))^2]^{1/2}) \qquad (10)$$

$$\overline{V}'_j(i) = \overline{W}'_j f(i) \cdot y([(W'^{(1)}_j f(i))^2 + (W'^{(2)}_j f(i))^2]^{1/2})$$

for all pixels i and all scales $0 \leq j < k$

This has the following effect: gradient vectors with small magnitude are multiplied by a larger factor than gradient vectors with large magnitude, so details of small amplitude are favoured at the expense of more striking ones.

The enhanced output frames $\underline{f}$ is then calculated by carrying out the IMG on $\overline{V}_0, \ldots, \overline{V}_{K-1}, S_K f$ (or $\overline{V}'_0, \ldots, \overline{V}'_{K-1}, S'_K f$).

If necessary, the grey values are then linearly rescaled to the original range.

Note that in this modification, only the gradient magnitudes are affected, not their directions. This is done to prevent artefacts upon reconstruction. However, this goal is only partly achieved, because the method treats the transform coefficients as if they were independent of each other. However this is not entirely true, since the gradient at the j-th scale is in fact a smoothed (possibly subsampled) version of the gradient at the j-1-th scale. If the gradients are independently modified in the above way, the latter property is lost, even more, $\overline{V}_0, \ldots, \overline{V}_{K-1}, S_K f$ is no longer a MGR.

This means that there exists no image g such that $\overline{V}_0, \ldots, \overline{V}_{K-1}, S_K f$ is the MGR of g.

The same holds of course in the case of pyramidal decomposition $\overline{V}'_0, \ldots, \overline{V}'_{K-1}, S'_K f$.

As a consequence, the gradients of the reconstructed image $\underline{f}$ will no longer be parallel to those of the original image f as we envisaged.

The distortion of edge gradient orientation due to the independent modification of MGR pixels at subsequent scales, is an unwanted effect, and may give rise to visible artefacts.

Artefact correction step

The above problem is solved if the reconstruction is applied to a set of gradient images $\overline{X}_0, \overline{X}_1, \ldots, \overline{X}_{K-1}$ instead of $\overline{V}_0, \ldots, \overline{V}_{K-1}$ (or $\overline{V}'_0, \ldots, \overline{V}'_{K-1}$) which comply to the following constraints D1. there exists an image g such that $\overline{X}_0, \overline{X}_1, \ldots, \overline{X}_{K-1}, S_K g$ is the MGR of g D2. $\overline{X}_j(i) \| \overline{W}_j f(i)$ ($\| \overline{W}'_j f(i)$) for all $0 \leq j < K$ and all pixels i D3. $\overline{X}_j$ is more equalized than $\overline{W}_j f(\overline{W}'_j f)$.

In D3, the term 'more equalized' is to be understood in the sense of equation (10): $\overline{X}_j$ is called more equalized than $\overline{W}_j f$ when, if $|\overline{W}_j f(i)|$ is 'small' then $|\overline{X}_j(i)| > |\overline{W}_j f(i)|$, while if $|\overline{W}_j f(i)|$ is 'large', then $|\overline{X}_j(i)| > |\overline{W}_j f(i)|$.

In other words, the artefact correction method aims at redirecting (D2) the gradient vectors of the enhanced (D3) image to the gradient directions of the original image in a way consistent with the multiscale gradient representation structure (D1).

We describe below two alternative embodiments of methods that construct such as set $\overline{X}_0, \overline{X}_1, \ldots, \overline{X}_{K-1}$.

Alternating convex projections,

It is well known that projecting alternatively onto two convex nondisjoint subsets of a linear space is a convergent scheme that yields a point in the intersection of these two sets (see Youla D., Webb, H., *Image restoration by the method of convex projections*, IEEE Trans. on Medical Imaging 1, 81–101 (1982)).

This knowledge is used in a first embodiment to construct gradient images satisfying the above demands D1,D2 and D3.

The method starts from the modified representation, $\overline{V}_0, \ldots, \overline{V}_{K-1}, S_K f$ (or from $\overline{V}'_0, \ldots, \overline{V}'_{K-1}, S'_K f$) defined in (10) and iterate an alternating sequence of projection operations onto the two vector spaces as follows:

1. projection onto the space W of multiscale gradients, i.e. all sets of vectorimages $\{\overline{X}_0, \overline{X}_1, \ldots, \overline{X}_{K-1}\}$ such that there exists an image g for which $\overline{X}_j = \overline{W}_j g$ (or $\overline{X}_j = \overline{W}'_j g$) for $0 \leq j < K$ 2. projection onto the space V|| of sets of vector images $\{\overline{X}_0, \overline{X}_1, \ldots, \overline{X}_{K-1}\}$, such that for all pixels i and all scales $0 \leq j < K$, $\overline{X}_j(i) \| \overline{W}_j f(i)$ or $(\overline{X}_j(i) \| \overline{W}'_j f(i)$.

The result of the first projection is fed into the second projection. The resulting vector-images are again fed into the first projection stage, and so on.

The first projection onto the space W of multiscale gradients is done by performing on a set of vector-images the multiscale gradient reconstruction procedure (equations (3) or (4), (5), (6), (7) and subsequently applying to the resulting image the multiscale gradient decomposition procedure (equation (1) or (4)). This projection operation is denoted by $P_W$.

The second projection operation onto the vector space $V_{\|}$ of images $\overline{X}_j$ of which the vector-valued pixel values are parallel to the corresponding gradient pixels of the multiscale gradient representation $\overline{W}_j f$, is done by taking the orthogonal projection onto $\overline{W}_j f(i)$ ($\overline{W}_j f(i)$ for every i and j. The orthogonal projection of a vector $\overline{v}$ onto the vector $\overline{w}$ is equal to $$\frac{v^{(1)}w^{(1)} + v^{(2)}w^{(2)}}{w^{(1)}w^{(1)} + w^{(2)}w^{(2)}}\vec{w}.$$

Projections onto $V_{\|}$, is denoted by $P_{v\|}$.

The output image is obtained by applying the IMG reconstruction process to the result of iterating the above alternation of projection operations $$P_{v\|}{}^o P_W \ldots P_{v\|}{}^o P_w \{\overline{V}_0, \ldots, \overline{V}_{K-1}, S_K f\} \quad (11)$$

and analogous in case of the pyramid scheme.

We need approximately 10 iterations for convergence, i.e. we need to do the operations $P_w, P_{v\|}$ 10 times. This algorithm results in a multiscale gradient representation that satisfies all three above constraints D1. D2. and D3.

Multiscale gradient projection

A second embodiment of the artefact correction process is described next, which is based on the multiscale stack embodiment of the MGR; subsequently a third embodiment of artefact correction based on the pyramidal representation will be disclosed.

The second embodiment is based on the fact that for every j, j≦j<K–1 there exists a linear operator $F_1$ on the space of vectorimages such that for every image f $$\overline{W}_{K-1} f = F_j(\overline{W}_j f) \quad (12)$$

This means that the multiscale gradient image at a specific scale can be computed from the multiscale gradient image at the preceding smaller scale by a linear filter operation $F_j(\ )$ $$\vec{W}_{j+1} f = ((g_{j+1} \otimes \delta_0) * S_{j+1} f, (\delta_0 \otimes g_{j+1}) * S_{j+1} f) \quad (13)$$
$$= ((g_{j+1} \otimes \delta_0) * (h_j \otimes h_j) * S_j f, (\delta_0 \otimes g_{j-1}) * (h_j \otimes h_j) * S_j f)$$
$$= ((g_{j+1} * h_j \otimes h_j) * S_j f, (h_j \otimes S_{j+1} * h_j) * S_j f)$$
$$= ((b_j * g_j \otimes h_j) * S_j f, (h_j \otimes b_j * g_j) * S_j f)$$
$$= ((b_j \otimes h_j) * (g_j \otimes \delta_0) * S_j f, (h_j \otimes b_j) * (\delta_0 \otimes g_j) * S_j f)$$
$$= ((b_j \otimes h_j), (h_j \otimes b_j)) * \vec{W}_j f$$

$F_j$ thus acts on a vector image $\overline{V}$ as $$F_j(\overline{V}) = (b_j * h_j, h_j * b_j) * \overline{V} \quad (14)$$

The result of this operation is also a vector image. From (13), the filter $b_j$ is defined by the relation $$b_j * g_j = g_{j-1} * h_j \quad (15)$$

Hence the filter coefficients of $b_j$ can be calculated from $h_0$ and $g_0$. This is done in the following way. Filters are often represented by their z-transform. The z-transform $A(z)$ of a filter a is a function of the complex number z defined by $A(z) = \Sigma a_k z^k$, where the sum runs over all filter taps k, in which $a_k$ are the coefficients of the filter kernel. With our choices of $h_0$ and $g_0$, $H_0(z) = 1/16(z^{-2} + 4z^{-1} + 6 + 4z + z^3)$ and $G_0(z) = 1/2(1-z)$ One of the advantages of the n-transform is that it converts a convolution into a product, i.e. for two filters a and b the z-transform of a+b is $A(z)B(z)$. Therefore $b_j$ can be easily calculated by means of its z-transform. From (15)

$$B_j(z) = G_j + 1(z) H_j(z)/G_1.(z).$$

This yields $B_0(z) = 1/16(z^{-3} + 5z^{-2} + 10z^{-1} + 10 + 5z + z^2)$, thus $b_0 = (1/16, 5/16, 10/16, \underline{10/16}, 5/16, 1/16)$, $b_1 = (1/16, 0, 5/15, 0, 10/16, \underline{0}, 10/16, 0, 5/16, 0, 1/16)$, etc.

The artefact correction method according to a second embodiment starts by decomposing the enhanced image $\underline{f}$ into its multiscale gradient representation, yielding $\overline{U}_0, \ldots, \overline{U}_{K-1}, S_K$.

In accordance with the criterion D2, these vectors have to be redirected in the direction of the multiscale gradients of the original image.

For $j=0, \ldots, K-1$, let $P_j$ denote the pixelwise orthogonal projection operator onto $\overline{W}_j f$. $1-P_j$ is then the pixelwise orthogonal rejection w.r.t. $\overline{W}_j f$. The orthogonal rejection $\overline{v}_\perp$ of a vector $\overline{v}$ w.r.t. the vector $\overline{w}$ is given by the formula $$\vec{v}_\perp = \vec{v} - \frac{v^{(1)}w^{(1)} + v^{(2)}w^{(2)}}{w^{(1)}w^{(1)} + w^{(2)}w^{(2)}}\vec{w}.$$

As a result of projecting $\overline{U}_0$ onto $\overline{W}_0 f$ according to $P_0$ some information is lost and this can lead to a loss of contrast upon reconstruction.

This lost information resides in $(1-P_0)\overline{U}_0$.

$1-P, \overline{U}_0$ has zero component along $\overline{W}_j f$. However, $F_j\{(1-P_0)\overline{U}_0\}$ does have a nonzero component along $\overline{W}_0 f$. And, $F_0\{(1-P_0)\overline{U}_0\}$, although it belongs formally to scale 1, can be considered as a contribution to scale 0, since it is in no way a smoothed version of $P_0 U_0$ (it is obtained from $(1-P_0) \overline{U}_0$). Therefore we add $(1/2)P_0 F_0\{(1-P_0)\overline{U}_0\}$ to $P_0 \overline{U}_0$. The factor 1/2 comes in because the filter $b_0$ used in the operation $F_0$ has gain (=sum of all filter taps) equal to 2, so by adding just $P_0 F_0\{(1-P_0)\overline{U}_0\}$ we would add a contribution that is 2 times too large.

By repeating this procedure the vector image at smallest scale $\overline{X}_0$ is defined by:

$$\vec{X}_0 = P_0 \vec{U}_0 + \frac{1}{2} P_0 F_0 (1-P_0) \vec{U}_0 + \frac{1}{4} P_0 F_1 (1-P_0) F_0 (1-P_0) \vec{U}_0 + \quad (16)$$
$$\ldots + \frac{1}{2^{K-1}} P_0 F_{K-2} (1-P_0) \ldots F_0 (1-P_0) \vec{U}_0$$

This will be the full contribution to scale 0.

The vector image at the next scale $\overline{X}_1$ is obtained in a similar way, starting from $F_0\{\overline{X}_0\}$ $$\vec{X}_1 = P_1(F_0 \vec{X}_0) + \frac{1}{2} P_1 F_1 (1-P_1)(F_0 \vec{X}_0) + \quad (17)$$
$$\frac{1}{4} P_1 F_2 (1-P_1) F_1 (1-P_1)(F_0 \vec{X}_0) + \ldots +$$
$$\frac{1}{2^{K-2}} P_1 F_{K-2} (1-P_1) \ldots F_1 (1-P_1)(F_0 \vec{X}_0)$$

and so on, and similarly $$\vec{X}_{K-2} = P_{K-2}(F_{K-3}\vec{X}_{K-3}) + \frac{1}{2}P_{K-2}F_{K-2}(1 - P_{K-2})(F_{K-3}\vec{X}_{K-3}) \quad (18)$$

$$\vec{X}_{K-1} = P_{K-1}(F_{K-2}\vec{X}_{K-2}) \quad (19)$$

The final output image is then reconstructed by applying the IMG to $\{\overline{X}_0, \ldots, \overline{X}_1, S_K\}$.

According to our findings, $\{\overline{X}_0, \ldots, \overline{X}_{K-1}, S_K\}$ satisfies constraints D2. and D1. exactly and D1. approximately.

This algorithm is faster than the alternating convex projection algorithm and preserves better the contrast gained in the contrast enhancement step.

We now indicate what changes should be made when using the pyramid decomposition scheme, according to a third embodiment of artefact correction.

There still exists a linear operator $F_0$ such that for every image f $$\overline{W}_{j-1}f = F_0(\overline{W}_j f) \quad (20)$$

but in this case $F_0$ acts on a vectorimage $\vec{V}$ as $$F_0(\vec{V}) = \downarrow (b_0 \otimes h_0, h_0 \otimes b_0) * \vec{V} \quad (21)$$

The filter $b_0$ is the same as defined before, but the operator $F_0$ also involves subsampling, denoted by $\downarrow$. The discarded components of projection $(1-P_j)$ are added back in a way similar to the second embodiment, but the effect of subsampling has to be encompassed by proper interpolation.

In our preferred embodiment bilinear interpolation was chosen, denoted by the operator I. This operator is applied to each of the contributions at larger scales, in order to match the image dimension of the next smaller scale.

the corrected gradient images $\vec{X}_j$ are then obtained by:

$$\vec{X}_0 = P_0\vec{U}_0 + \frac{1}{2}P_0IF_0'(1-P_0)\vec{U}_0 + \frac{1}{4}P_0I^2F_0(1-P_0)F_0(1-P_0)\vec{U}_0 + \quad (22)$$
$$\ldots + \frac{1}{2^{K-1}}P_0I^{K-1}F_0(1-P_0)\ldots F_0(1-P_0)\vec{U}_0$$

$$\vec{X}_1 = P_1(F_0'\vec{X}_0) + \frac{1}{2}P_1IF_0'(1-P_1)(F_0'\vec{X}_0) +$$
$$\frac{1}{4}P_1I^2F_0(1-P_1)F_0'(1-P_1)(F_0'\vec{X}_0) + \ldots +$$
$$\frac{1}{2^{K-2}}P_1I^{K-2}F_0'(1-P_1)\ldots F_0'(1-P_1)(F_0'\vec{X}_0)$$

$$\vec{X}_{K-2} = P_{K-2}(F_0'\vec{X}_{K-3}) + \frac{1}{2}P_{K-2}IF_0'(1-P_{K-2})(F_0'\vec{X}_{K-3})$$

$$\vec{X}_{K-1} = P_{K-1}(F_0'\vec{X}_{K-2})$$

Of course, when projecting a gradient field at some larger scale onto a gradient field at a smaller scale, we have to identify the corresponding pixels, i.e. if $\overline{Y}$ is k scales larger than $\overline{Z}$ the pixel (x,y) of $\overline{Y}$ should be identified with the pixel $(x2^k, y2^k)$ of $\overline{Z}$.

What is claimed is:

1. A method of correcting artefacts in a processed digital image f represented by a multi-scale gradient representation $V = \{\overline{V}_0, \ldots, \overline{V}_{K-1}, S_K f\}$ comprising gradient images at multiple resolution levels and a residual image, said gradient representation being obtained by non-linear processing of a multi-scale gradient representation $W = \{\overline{W}_0 f, \ldots, \overline{W}_{K-1} f, S_K f\}$ of an original image f, characterized by the steps of (i) generating a modified gradient representation by modifying the gradient images of V to make their directions pixelwise equal to those of W, and (ii) reconstructing a final output image from this modified gradient represented by applying an inverse multiscale gradient transform (IMG), said inverse transform being such that it yields f when being applied to W.

2. A method according to claim 1 wherein a multiscale gradient representation $X = \{\overline{X}_0, \overline{X}_1, \ldots, \overline{X}_{K-1}, S_K\}$, K>1 is generated and wherein said final output image is reconstructed from said multiscale gradient representation $X = \{\overline{X}_0, \overline{X}_1, \ldots, \overline{X}_{K-1}, S_K\}$, K>1, said multiscale gradient representation $\{\overline{X}_0, \overline{X}_1, \ldots, \overline{X}_{K-1}, S_K\}$, K>1 satisfying the following constraints:

(1) an image $g \neq f$ exists such that for $j=0, \ldots, K-1, \overline{X}_j$ represents the gradient image of g at the j-th scale, (2) in every pixel $\overline{X}_j$ has the same direction as the multiscale gradient image $\overline{W}_j f$ of the original image f at the j-th scale, (3) if the original multiscale gradient image $\overline{W}_j$ has small magnitude, then the magnitude of $\overline{X}_j$ is larger than the magnitude of the original gradient image; if the original gradient image has large magnitude, then the magnitude of $\overline{X}_j$ is smaller than the magnitude of the original gradient image, at each pixel and at each scale j.

3. A method according to claim 2, wherein the multiscale gradient representation of the original image is obtained by (i) applying one-dimensional gradient filters independently to the rows and columns of a digital image representation of the original image thereby yielding the horizontal and vertical components of the multiscale gradient image at the smallest scale, and applying a two-dimensional low-pass filter to said digital representation of the original image, thereby yielding an approximation of the original image at a next larger scale, (ii) identifying the above operations as the first stage of an iterative loop, and performing additional iterations using the approximation image resulting from a previous iteration instead of the original image, with the filters being adapted to the current scale, thereby yielding gradient and approximation images of the original image at the successively larger scales.

4. A method according to claim 3, where said gradient filters have filter coefficients (0.5, −0.5) or a multiple thereof and where the low-pass filtering is obtained by applying a horizontal one-dimensional low-pass filter to the rows of an image, followed by a vertical one-dimensional low-pass filter applied to the columns of the resulting image of the horizontal filter, both low-pass filters having coefficients selected from the following set: (0.5, 0.5), (0.25, 0.5, 0.25), (0.0625, 0.25, 0.375, 0.25, 0.0625).

5. A method according to claim 2, wherein constraints (1) to (3) are fulfilled by (A) obtaining an initial estimate of the multiscale gradient representation X by:

a) applying an inverse multiscale gradient transform (IMG) to the multiscale representation V of the processed image f, and subsequently decomposing the resulting image into a multiscale gradient representation X', b) redirecting all vector-valued pixels of X' obtained in (a) by pixelwise orthogonal projection onto the pixels of the multiscale gradient representation W of the original image, yielding a multiscale gradient representation X', so that the pixels of X" and W have identical directions at all scales, (B) identifying the above operations as the first step of an iterative loop and performing additional iterations using the result X' of step (b) from the previous iteration as the input of step (a) of the current iteration, instead of V, thereby yielding subsequent improved estimates of the multiscale gradient representation X', (C) obtaining a multiscale gradient representation X as the result X" of step (2), after the last iteration.

6. A method according to claim 2 wherein constraints (1) to (3) are fulfilled by:

applying an inverse multiscale gradient transform (IMG) to the multiscale representation V of the processed image $\underline{f}$, and subsequently decomposing the resulting image into a multiscale gradient representation $U=\{\overline{U}_0, \overline{U}_1, \ldots, \overline{U}_{K-1}, S_K\}$, obtaining $\overline{X}_0$ as the sum $$\sum_{K=0}^{K-1} \vec{Y}_{0k}$$

where $\overline{Y}_{0k}$ is obtained from $\overline{U}_0$ by applying the following steps:

Take $\overline{U}_0$ to be the first input of A1 and

A. Repeating for j=0 to k;
 1. extract the component of the input vector image parallel to $\overline{W}_0 f$ and the component of the input vector image orthogonal to $\overline{W}_0 f$ by pixelwise orthogonal projection of this input vector image onto $\overline{W}_0 f$, the parallel component being the output vector image of A1,
 2. if j<k, apply an operator $F_j$ to the orthogonal component, the operator $F_j$ being such that it yields $\overline{W}_{j+1} f$ when acting on $\overline{W}_j f$, divide this result by a factor of 2, use this result as the next input to step A1, B. Taking the last output of A1, corresponding with loop index j=k, and if necessary interpolating this result to get the same number of pixels as $\overline{W}_0 f$, the output of B being $\overline{Y}_{0k}$, for i=1, . . . , K−1, obtaining $\overline{X}_i$ as the sum $$\vec{X}_i = \sum_{k=i}^{k-1} \vec{Y}_{ik},$$

where $\overline{Y}_{ik}$ is obtained from $F_{i-1}(\overline{X}_{i-1})$ by the following procedure:

Take $F_{i-1}(\overline{X}_{i-1})$ to be the first input of C1

C. Repeating for j=i to K:
 1. extract the component of the input vector image parallel to $\overline{W}_j f$ and the component of the input vector image orthogonal to $\overline{W}_j f$ by pixelwise orthogonal projection of this input vector image onto $\overline{W}_j f$, the parallel component being the output to C1,
 2. If j<k, apply an operator $F_j$ to the orthogonal component, the operator $F_j$ being such that it yields $\overline{W}_{j+1} f$ when acting on $\overline{W}_j f$ and divide this result by 2, use this resulting vector image as the next input of C1.

D. Taking the last output of C1, and if necessary interpolate this result to get the same number of pixels as $\overline{W}_i f$.

7. A method according to claim 1, wherein the multiscale gradient representation of the original image is obtained by (i) applying one-dimensional gradient filters independently to the rows and columns of a digital image representation of the original image thereby yielding the horizontal and vertical components of the multiscale gradient image at the smallest scale, and applying a two-dimensional low-pass filter to said digital representation of the original image, thereby yielding an approximation of the original image at a next larger scale, (ii) identifying the above operations as the first stage of an iterative loop, and performing additional iterations using the approximation image resulting from a previous iteration instead of the original image, with the filters being adapted to the current scale, thereby yielding gradient and approximation images of the original image at the successively larger scales.

8. A method according to claim 7, where said gradient filters have filter coefficients (0.5, −0.5) or a multiple thereof and where the low-pass filtering is obtained by applying a horizontal one-dimensional low-pass filter to the rows of an image, followed by a vertical one-dimensional low-pass filter applied to the columns of the resulting image of the horizontal filter, both low-pass filters having coefficients selected from the following set: (0.5, 0.5), (0.25, 0.5, 0.25), (0.0625, 0.25, 0.375, 0.25, 0.0625).

9. A method according to claim 1 wherein said non-linear processing is a contrast enhancing processing.

* * * * *